Patented June 5, 1951

2,555,901

UNITED STATES PATENT OFFICE 2,555,901

REACTION PRODUCTS OF PETROLEUM HYDROCARBON-INSOLUBLE PINE-WOOD RESIN AND ETHYLENE OXIDE

Alfred L. Rummelsburg, Wilmington, Del., assignor to Hercules Powder Company, Wilmington, Del., a corporation of Delaware No Drawing. Application December 1, 1949, Serial No. 130,587

9 Claims. (Cl. 260—104)

This invention relates to water-insoluble resins derived from a petroleum hydrocarbon-insoluble pine wood resin and ethylene oxide and to methods for the production thereof.

The petroleum hydrocarbon-insoluble pine wood resin with which this invention is concerned is obtained in connection with the production of wood rosin from pine wood. The petroleum hydrocarbon-insoluble pine wood resin comprises a residue low in abietic acid remaining after the separation of refined rosin high in abietic acid from the resinous material obtained by extraction of pine wood with a solvent capable of extracting the petroleum hydrocarbon-insoluble resin component. It is characterized by substantial insolubility in cold petroleum hydrocarbons, but will differ somewhat in its specific characteristics such as acid number, melting point, petroleum ether solubility, content of toluol-soluble matter, etc., depending upon the method for the recovery of rosin from pine wood used in its production.

Petroleum hydrocarbon-insoluble pine wood resin has been reacted heretofore with polyhydric alcohols, and particularly with ethylene glycol, with or without esterification catalysts being present, to yield a hard resin. See in this connection U. S. 2,138,193 to E. G. Peterson. Example III thereof shows the use of about two chemical equivalents of ethylene glycol to one of the pine wood resin (equivalency in the case of the resin being based on acid number), and the resulting product may be regarded as the monoester of ethylene glycol and the pine wood resin. By using one-half the amount of ethylene glycol, i. e., one chemical equivalent, a product is obtained which may be regarded as the normal ester of ethylene glycol and the pine wood resin. Both types of products are characterized by water- and gasoline-insolubility.

It would be expected that the reaction of ethylene oxide with petroleum hydrocarbon-insoluble pine wood resin would produce the same type of product as that obtained with ethylene glycol. It has been found, however, that such is not the case and that the products obtained are inherently different.

In accordance with this invention, there are provided water-insoluble resinous reaction products from petroleum hydrocarbon-insoluble pine wood resin and ethylene oxide. These resinous reaction products are formed by the reaction of the pine wood resin and ethylene oxide to such an extent that the resinous reaction products contain from about 12% to about 60% (based on the pine wood resin) of combined ethylene oxide. The resinous reaction products are further characterized by being substantially free of carboxyl acidity as evidenced by their acid numbers determined in an isopropyl alcohol-benzene medium and by having a substantially reduced phenolic hydroxyl acidity as compared with the original pine wood resin as evidenced by the respective acid numbers determined in an ethylenediamine medium. These two types of acid number determinations are discussed in some detail hereinafter.

The reaction between petroleum hydrocarbon-insoluble pine wood resin and ethylene oxide can be effected with or without a catalyst present. Preferably, a catalyst is employed and for this purpose there may be employed an ethylene oxide addition catalyst, i. e., any material which will catalyze the addition of ethylene oxide to a material having a reactive hydrogen atom with the result that a polyalkylene glycol radical is substituted for the reactive hydrogen atom. Of all such materials, it is preferred to employ an alkaline material, i. e., a compound which is alkaline-reacting in aqueous solution, as catalyst. Thus, for example, catalysts such as sodium methylate, sodium hydroxide, etc. may be employed.

Prior to comparing the properties of the products of this invention with those of the prior art derived from ethylene glycol, it will clarify matters to mention a few facts about the chemical constitution of petroleum hydrocarbon-insoluble pine wood resin. This material, as is well known to the art, consists of a highly complex mixture of organic compounds. It appears, however, that the functional groups which predominate in the material are carboxyl and phenolic OH groups. That there are phenolic OH groups as well as carboxyl groups in the material can be shown by comparing the acid number of the material as determined by the standard method to be more fully described infra with the acid number of the material as determined by the method of Moss, Elliott and Hall, Anal. Chem., vol. 20, pages 784–788. The former method involves the titration of a sample of the material dissolved in an isopropyl-alcohol-benzene mixture, whereas the latter method involves the titration of a sample of the material dissolved in ethylenediamine. (Acid numbers determined by the former method will hereinafter be referred to as "A. N. (isopropyl alcohol-benzene)" and by the latter method "A. N. (ethylenediamine).") The former determination constitutes a measure of the carboxyl acidity only of a compound, whereas the latter constitutes a measure of carboxyl acidity and phenolic hydroxyl content. If the above-suggested comparison is made, it will be found that in the case of petroleum hydrocarbon-insoluble pine wood resin the A. N. (ethylenediamine) will be substantially larger than the A. N. (isopropyl alcohol-benzene), this difference evidencing the presence of a substantial phenolic hydroxyl content in the pine wood resin. On the average sample of the pine wood resin the A. N.'s will run 230–275 and 85–100, respectively.

Comparison of the products of this invention derived from ethylene oxide with those of the prior art derived from ethylene glycol shows that the former have comparatively low A. N.'s (ethylenediamine) whereas the latter have very high A. N.'s (ethylenediamine). As is illustrated by the examples infra, it is possible by using comparatively high ratios of ethylene oxide to petroleum hydrocarbon-insoluble pine wood resin to reduce the A. N. (ethylenediamine) to a very low figure. It is evident, therefore, that in the case of ethylene oxide, reaction takes place with the phenolic hydroxyl groups as well as with the carboxyl groups. In the case of the prior art ethylene glycol reaction, the phenolic hydroxyl groups do not appear to take part in the reaction and remain as such in the final product.

It has been found, too, that the ethylene oxide-derived products of this invention have a unique characteristic in that they contain polyhydric alcohol constituents in substantial amount and that from a chemical standpoint they may be considered to be polyhydric alcohols. Clear proof of this can be found in the fact that upon esterification of the adducts with a tricarboxylic acid, gelation takes place with ease. The prior art products derived from ethylene glycol do not gel upon heating with a tricarboxylic acid and accordingly do not contain polyhydric alcohol constituents. In view of this novel characteristic of the products of this invention, they are useful in the preparation of alkyd resins, synthetic plasticizers, etc.

As stated hereinabove, the petroleum hydrocarbon-insoluble pine wood resin with which this invention is concerned is obtained in connection with the production of wood rosin from pine wood. It is rather unique in that it is substantially insoluble in cold petroleum hydrocarbons. As is well known, rosin may be extracted from pine wood by the use of a suitable solvent such as hot gasoline, or a coal tar hydrocarbon, as benzol, toluol, xylol, etc. after steaming of the wood with live steam to remove volatile oils such as turpentine and pine oil. The volatile oils as turpentine and pine oil may be extracted with the rosin without first steaming for their removal. Preferably, pine wood is extracted with a coal tar hydrocarbon so as to provide the highest yield of the petroleum hydrocarbon-insoluble pine wood resin utilized in this invention.

Following extraction, the extract is distilled for the removal of solvent where the wood was subjected to steaming before extraction and for the removal of solvent and volatile oils, as turpentine and pine oil, where the wood was extracted directly without steaming. As the result of distillation there is obtained a resinous material containing rosin high in abietic acid content and a resinous material characterized by substantial insolubility in petroleum hydrocarbons. This resinous material may be treated in any one of a number of ways all known to the art for the removal of the rosin high in abietic acid content. The residue remaining after the removal of rosin comprises the dark-colored hard material low in abietic acid which is utilized in this invention and designated as petroleum hydrocarbon-insoluble pine wood resin.

The exact properties of the petroleum hydrocarbon-insoluble pine wood resin obtained as indicated above will depend upon the particular method used for the extraction of the wood and on the method of separating refined rosin from the resinous extract. A comparison of the properties of four pine wood resins is given in the following table, in which Resin A is that obtained by extraction of pine wood with hot petroleum solvent under pressure subsequent to the removal of the volatile oils by steam distillation, refining with furfural, and evaporation of the furfural layer to provide Resin A as a residue. Resin B is that obtained by extracting unsteamed pine wood with benzol, evaporating the benzol and volatile oils and dissolving the residue in low-boiling petroleum solvent at an elevated temperature, washing the solution with water and cooling to precipitate Resin B. Resin C is the product obtained by refining of the gasoline solution of the crude resin obtained by the benzol extraction of pine wood with furfural and comprises the resinous product obtained by evaporation of the furfural layer. Resin D is obtained by treatment of the crude resin resulting after evaporation of the benzol from the benzol extract of pine wood with a mixture of a petroleum hydrocarbon solvent and a solvent for the petroleum hydrocarbon-insoluble material such as furfural, and comprises the resinous material obtained by evaporation of the furfural layer.

|  | Resin A | Resin B | Resin C | Resin D |
|---|---|---|---|---|
| Melting Point (Hercules drop method), °C | 91 | 115 | 102 | 95–125 |
| A. N. (isopropyl alcohol-benzene) | 85–100 | 85–100 | 85–100 | 85–100 |
| Unsaponifiable matter, per cent |  | 5 | 8 |  |
| V. M. & P. naphtha insoluble, per cent | 89.5 | 96 | 83 |  |
| Toluol soluble, per cent |  | 40 | 98 |  |
| Petroleum ether insoluble, per cent | 92.0 | 99 | 95 | 90–99 |
| Saponification number |  | 169 | 140 |  |
| Ash, per cent |  | .036 | .022 |  |
| Methoxy content, per cent |  |  |  | 3–6 |

Having described the invention in its broad aspects, there follow certain specific examples which are illustrative of specific embodiments of the broad invention. The specific examples should, however, not be considered as limiting the invention. All parts and percentages are by weight unless otherwise indicated.

*Example 1*

The apparatus employed in carrying out this example consisted of a stainless steel pressure autoclave which was provided with external electrical heating, an internal cooling coil, an agitator, a pressure gage, and thermometer well. Using this apparatus, ethylene oxide could be gradually introduced into the autoclave through an inlet by means of a calibrated mechanical pump which was attached to an ethylene oxide storage system and also to the autoclave inlet. Temperature control was effected by controlling the rate of addition of ethylene oxide and by externally heating and internally cooling of the autoclave.

The autoclave was charged with 1000 g. of petroleum hydrocarbon-insoluble pine wood resin, 230 g. of toluene, 5 g. of sodium methylate as catalyst, and a trace of an antifoam agent. After flushing the autoclave with nitrogen, about 235 g.

of ethylene oxide was gradually pumped into the autoclave with agitation over a period of 2 hours at a temperature of 100–140° C. During this period the ethylene oxide pressure was held between 63 p. s. i. minimum and 140 p. s. i. maximum. The reaction mixture was very viscous and for that reason was dissolved in a mixture of 500 cc. of benzene and 500 cc. of ethyl alcohol to permit efficient handling. Both the initial and later added solvents were evaporated from the reaction mixture using a final bath temperature of 208° C. and a pressure of 5–6 mm. Toward the end of this distillation, about 55 g. of high-boiling oils came over which were soluble in water. (These oils appeared to be largely ethylene glycol and diethylene glycol formed in the reaction due to the presence of traces of moisture.) There remained after the distillation 1145 g. of petroleum hydrocarbon-insoluble pine wood resin-ethylene oxide addition product. The actual yield was somewhat greater than this due to the fact that about 20–40 g. of reaction mixture was lost in transferring the reaction mixture from the autoclave.

The product so obtained was a water-insoluble hard resin having the following analysis:

| | |
|---|---|
| OH (Zerewitinoff) _____per cent__ | 9.7 |
| OH (acetylation) _____do____ | 7.2 |
| A. N. (isopropyl alcohol-benzene) _____ | 2.0 |
| A. N. (ethylenediamine) _____ | 34 |
| Drop softening point_____° C__ | 98 |

The A. N. (ethylenediamine) of petroleum hydrocarbon-insoluble pine wood resin runs 230–275. In view of the low A. N. (ethylenediamine) of the product of this example, it is apparent that most of the COOH and phenolic OH groups have been removed by reaction with ethylene oxide.

*Example 2*

Example 1 was duplicated with the exception that 285 g. of ethylene oxide was introduced into the autoclave in place of the 235 g. of Example 1. The ethylene oxide was gradually introduced over a period of 7 hours. The pressure within the autoclave during this period varied from 80–180 lb./sq. in.; the temperature varied from 150–158° C. The amount of addition product remaining after distillation of the solvent was 1105 g. It was water- and gasoline-insoluble. It was analyzed with the following results:

| | |
|---|---|
| OH (Zerewitinoff) _____per cent__ | 9.6 |
| OH (acetylation) _____do____ | 6.4 |
| A. N. (isopropyl alcohol-benzene) _____ | 2.0 |
| A. N. (ethylenediamine) _____ | 17 |
| Drop softening point_____° C__ | 108 |

*Example 3*

This example is illustrative of carrying out the reaction of petroleum hydrocarbon-insoluble pine wood resin and ethylene oxide in the presence of the sodium soap of said pine wood resin as catalyst, the said catalyst being formed in situ in the pine wood resin prior to the introduction of the ethylene oxide.

To prepare the petroleum hydrocarbon-insoluble pine wood resin with catalyst formed in situ a 500-g. lot of the pine wood resin was heated to 190° C. with agitation in glass equipment and 45 cc. of 1 N alcoholic NaOH was gradually added thereto. Agitation was continued for ½ hour after adding the caustic. Traces of ethyl alcohol remaining in the product were removed by reducing the pressure to 20 mm. at a bath temperature of 210° C.

Into 150 g. of the resulting material ethylene oxide was bubbled with agitation at 200° C. for a period of 9.5 hours. The reaction product was then distilled at a bath temperature of 230° C. at 20 mm. pressure. About 5 g. of distillate was obtained which was, for the most part, soluble in water and was apparently ethylene and diethylene glycols. The remaining product, i. e., the petroleum hydrocarbon insoluble pine wood resin-ethylene oxide addition product, was found to contain about 16.4% of combined ethylene oxide by virtue of the fact that it increased in weight 19.5% as compared with the starting material. This addition product was characterized by water insolubility and gasoline insolubility. Upon analysis it gave the following results:

| | |
|---|---|
| OH (Zerewitinoff) _____per cent__ | 6.1 |
| A. N. (isopropyl alcohol-benzene) _____ | nil |
| A. N. (ethylenediamine) _____ | 12 |
| Drop softening point_____° C__ | 135 |

About 72 g. of this petroleum hydrocarbon-insoluble pine wood resin-ethylene oxide reaction product was heated to 200° C. About 20 g. of tricarballylic acid was added with agitation. After 1 minute at 200° C. a gel formed which upon cooling became brittle. The gel formation evidences the polyhydric character of the petroleum hydrocarbon-insoluble pine wood resin-ethylene oxide reaction product.

*Example 4*

The equipment used in this preparation comprised a 20-gallon stainless steel jacketed autoclave containing a suitable inlet through which ethylene oxide could be pumped, and a propeller-type agitator. Dowtherm heating was provided. About 80 lb. of petroleum hydrocarbon-insoluble pine wood resin, 0.8 lb. sodium methylate and a trace of an antifoam agent were charged into the autoclave. About 21 lb. of ethylene oxide was gradually pumped into the agitated mixture during a period of about 4 hours at 165–185° C. The pressure during this period varied between 25 and 130 p. s. i. At the end of this period, the pressure within the autoclave was released and the product sparged with nitrogen for ¼ hour at 175° C.

The resulting product was a water- and gasoline-insoluble hard resin having the following analysis:

| | |
|---|---|
| OH (Zerewitinoff) _____per cent__ | 7.9 |
| OH (acetylation) _____do____ | 8.1 |
| A. N. (isopropyl alcohol-benzene) _____ | nil |
| A. N. (ethylenediamine) _____ | 16 |
| Drop softening point_____° C__ | 89 |

The resinous reaction product so obtained was esterified with an additional amount of petroleum hydrocarbon-insoluble pine wood resin using a 60-gallon jacketed nickel kettle provided with Dowtherm heating and a means for removing water formed. Chemically equivalent amounts of the materials were used based on the per cent hydroxyl (acetylation method) of the resinous reaction product and on the A. N. (isopropyl alcohol-benzene) of the petroleum hydrocarbon-insoluble pine wood resin. Thus, 164 lbs. of petroleum hydrocarbon-insoluble pine wood resin and 60 lbs. of the resinous reaction product were heated at 250–290° C. for a period of about 5 hours until the A. N. (isopropyl alcohol-benzene) of the mixture was reduced to about 5. (The temperature was gradually increased within this range during the period.) The yield of ester obtained in this manner was 185 lbs. There was a small amount of handling loss, as well as of some oils which steam-distilled off as the water of esterification was removed. The final ester had a drop softening point of 146° C.

As previously mentioned, although a catalyst is not necessary, it is preferred to employ an ethylene oxide addition catalyst in carrying out the reaction with which this invention is concerned. By "ethylene oxide addition catalyst" there is meant any material which will catalyze the addition of ethylene oxide to a material having a reactive hydrogen atom with the result that a polyethylene glycol radical is substituted for the reactive hydrogen atom. Among compounds having reactive hydrogen atoms, there may be mentioned carboxylic acids, alcohols, phenols, amines, amides, etc. It is well known to the art that certain materials are effective catalysts for the type of addition reaction just mentioned. As examples of such materials, there may be mentioned alkaline materials such as alkali metal hydroxides, as sodium hydroxide, potassium hydroxide, etc., alkali metal salts as sodium carbonate, sodium acetate, potassium carbonate, etc., alkali metal resinates, as the sodium soap of rosin, the sodium soap of petroleum hydrocarbon-insoluble pine wood resin, etc., alkaline earth metal oxides as calcium oxide, barium oxide, etc., alkaline earth metal hydroxides, as calcium hydroxide, barium hydroxide, etc., and alkali metal alkylates, as sodium methylate, potassium methylate, sodium ethylate, etc. Other ethylene oxide addition catalysts are acidic substances such as hydrochloric acid, sulfuric acid, phosphoric acid, sodium bisulfate, potassium bisulfate, etc., also surface active substances such as bleaching earths, activated charcoals, etc.

It is preferred in making the compounds of this invention to employ an alkaline material as catalyst. In general, the use of the alkaline material as catalyst makes for easier control of the reaction as compared with the use of other possible catalysts. By "alkaline material" there is meant a compound which is alkaline-reacting in aqueous solution. The alkaline materials mentioned in the foregoing paragraph are representative of this preferred class of catalysts and it is still further preferred to employ as catalyst an alkaline material which is a compound of an alkali metal. Thus, the alkali metal hydroxides, the alkali metal resinates, the alkali metal alkylates, etc. are in this most preferred class.

The proportions of catalysts employed may be varied widely. However, in general, it has been found that at least 0.1% catalyst based on the weight of the petroleum hydrocarbon-insoluble pine wood resin should be used to obtain practical reaction rates. Preferably from 0.5% to 2.0% catalyst is employed, although higher proportions of catalyst may be used if desired.

The reaction here involved can be carried out at atmospheric or superatmospheric pressure. However, atmospheric pressure cannot be employed unless a catalyst is employed in the reaction. When operating at atmospheric pressure, the ethylene oxide is permitted gradually to bubble through the petroleum hydrocarbon-insoluble pine wood resin in molten condition with accompanying agitation for a prolonged period or until the desired extent of reaction has occurred. Under these conditions it is difficult to introduce into the pine wood resin more than one molecule of ethylene oxide for each carboxyl and phenolic hydroxyl group of the pine wood resin. In other words, under these conditions hydroxyethylation of the pine wood resin occurs. (Substantially complete hydroxyethylation of the pine wood resin is reached when the combined ethylene oxide is about 17–25% based on the original pine wood resin.) If, however, superatmospheric pressure is utilized, the ethylene oxide is gradually pumped into the agitated molten pine wood resin (preferably, although not necessarily, with the catalyst present) in an autoclave. Using superatmospheric pressure, any desired quantity of ethylene oxide can be introduced. Thus, either hydroxyethylation or hydroxypolyoxyethylation can be obtained depending upon the amount of ethylene oxide utilized. When superatmospheric pressure is used, the practical range of operating pressure is from about 15 to 200 p. s. i.; preferably from about 30 to about 150 p. s. i. is employed.

When operating under superatmospheric pressure, it is often desirable to utilize an inert solvent for the petroleum hydrocarbon-insoluble pine wood resin. Any solvent which is unreactive with the reactants here involved under the conditions employed may be utilized. For example, benzene, toluene, etc. are useful. Generally from 10 to 100% solvent is employed based on the weight of the petroleum hydrocarbon-insoluble pine wood resin. Following the reaction, the solvent is removed by distillation leaving the desired reaction product as the residue.

As stated previously, the reaction of the ethylene oxide with the petroleum hydrocarbon-insoluble pine wood resin is carried out at a temperature of at least 80° C. but below the temperature of decomposition of the pine wood resin. Somewhat lower temperatures than 80° C. can be employed but the reaction rates are impractical. The preferred range for practical operating purposes is 120 to 175° C.

It is oftentimes desired to remove the catalyst employed for the reaction from the reaction product. This may be accomplished by washing the reaction product with aqueous mineral or organic acid followed by a water wash. This procedure obviously applies to the use of alkaline materials as catalysts. When acidic materials are used as catalysts, the reaction products are washed with aqueous basic materials.

As an alternative to the procedure described hereinabove which involves simply reaction of petroleum hydrocarbon-insoluble pine wood resin with ethylene oxide, there is mentioned a two-step process which involves first reacting the pine wood resin with ethylene glycol under conditions adapted to yield the monoester of ethylene glycol. (As stated previously, the phenolic hydroxyl groups of the pine wood resin do not react under these conditions.) For the conditions required for this reaction, see U. S. 2,138,193. The monoester is then reacted with ethylene oxide, under the conditions described hereinabove for the reaction of pine wood resin and ethylene oxide, to provide a water-insoluble resin characterized by having a total combined ethylene oxide content of from about 12% to about 60% (including both the ethylene oxide per se reacted and the ethylene oxide equivalent of the ethylene glycol reacted). The products made by this two-step process have substantially the same properties as those derived by the comparatively simple and more direct process of reacting the pine wood resin per se and ethylene oxide.

The products of this invention vary in physical appearance from hard resins to balsamic-type products. The products having a combined ethylene oxide content of from about 12% to about 25% based on the petroleum hydrocarbon-insoluble pine wood resin are hard resinous materials. With the addition of increasing amounts of ethylene oxide, products of decreased softening point are obtained. Ultimately, balsamic-type products are obtained.

The products of the invention are characterized by being substantially free of carboxyl acidity. By "substantially free of carboxyl acidity" it is meant that the products have an A. N. (isopropyl alcohol-benzene) of less than 10. Usually, the A. N.'s (isopropyl alcohol-benzene) of the products are closer to zero than to 10 as evidenced by the illustrative examples hereof. As stated previously, the products of this invention have a substantially reduced phenolic hydroxyl acidity as compared with the original petroleum hydrocarbon-insoluble pine wood resins from which they were produced as evidenced by the respective A. N.'s (ethylenediamine). To be more specific, the products of this invention have a maximum A. N. (ethylenediamine) of about 70. Within the limits of the invention products having a comparatively low combined ethylene oxide content tend to approach the maximum figure whereas those having a comparatively high combined ethylene oxide content have A. N.'s (ethylenediamine) considerably below the maximum.

As has been stated previously, the products of this invention have alcoholic constituents which are polyhydric in character. Hence, chemically they may be regarded as polyhydric alcohols. As such, they may be esterified with polycarboxlic acids to provide alkyd resins. The usual modifiers such as rosin acids, fatty acids, etc. may be employed. For example, the subject petroleum hydrocarbon-insoluble pine wood resin-ethylene oxide reaction products may be reacted with sebacic acid and castor oil fatty acids to provide resins which are compatible with ethyl cellulose and productive of very flexible films therewith. This particular alkyd resin is useful in conjunction with ethyl cellulose as a cable lacquer. The alkyd resins resulting from the petroleum hydrocarbon-insoluble pine wood resin-ethylene oxide reaction products are useful generally in the protective coating and adhesive fields.

The subject petroleum hydrocarbon-insoluble pine wood resin-ethylene oxide addition products may also, in view of their polyhydric character, be reacted with suitable fatty acids to provide products which find utility as plasticizers. Thus, the ester resulting from esterification with castor oil fatty acids is a viscous liquid which has plasticizing action for ethyl cellulose. Similarly, the addition products may be reacted with additional petroleum hydrocarbon-insoluble pine wood resin as shown in Example 4 hereof, to provide desirable hard resinous esters having exceptionally high resistance to petroleum hydrocarbon solvents. Such ester resins are useful in the manufacture of mastic floor tiles of the type known as "grease-resistant." Other uses for the subject addition products of petroleum hydrocarbon-insoluble pine wood resin and ethylene oxide include sulfation with known sulfating agents, as chlorsulfonic acid, sulfur trioxide, etc. to provide ionic surface active agents, and xanthation to provide flotation agents.

The so-called "standard" method referred to hereinabove for determining the acid number of petroleum hydrocarbon-insoluble pine wood resin and reaction products thereof is a potentiometric method. The apparatus required is (1) a pH meter such as the Leeds and Northrup and the Beckman pH meters, or the Fisher titrimeter; (2) a standard glass electrode and a standard saturated calomel electrode with leads for the particular meter used; and (3) a stirring motor. The pH meter employed should be standardized with two aqueous buffer solutions of pH 10 and 12, respectively, prior to use.

A 2.0 to 2.5 g. sample of the petroleum hydrocarbon-insoluble pine wood resin or reaction product is weighed, to the nearest 0.001 g., into a 250 ml. beaker. One hundred milliliters of benzene-isopropyl alcohol solution is added and the resin dissolved, heating if necessary. The benzene-isopropyl alcohol solution is a 1:1 mixture (by volume) of 99% isopropyl alcohol and commercial grade benzene to which has been added 5 ml. of water per liter of the mixture.

The pH meter and electrodes referred to above are set up for use. The electrodes are rinsed with benzene-isopropyl alcohol solution and wiped with a clean cloth. They are then rinsed with distilled water and again wiped with a clean cloth. The ground glass sleeve is removed from the calomel electrode and both ground surfaces thereof wiped with a clean cloth. The sleeve is replaced and saturated potassium chloride solution contained in the electrode is allowed to fill the ground area. Excess potassium chloride solution is wiped off. The beaker containing the sample is placed under the electrodes being careful not to strike the bottom of the calomel electrode. The solution in the beaker should not cover the sleeve of the calomel electrode. About ¾" depth is required. The pH meter is turned on and allowed several minutes for equilibrium.

With the stirring motor on, the solution is titrated with 0.25 or 0.5 N alcoholic KOH (prepared from 90% methanol or 99% isopropyl alcohol) to the pH or dial reading indicated below, depending upon whether a regular pH meter or a Fisher titrimeter is employed in the titration. The titrant should be added in 2-3 drop increments near the end point.

| pH Reading | Fisher Titrimeter Reading at 25° C. |
|---|---|
| 11.0 | 68 |

An arbitrary end point must be employed in the case of petroleum hydrocarbon-insoluble pine wood resin or reaction products thereof due to the fact there is no sharp inflection in the potentiometeric titration curve.

A blank titration is run on 100 ml. of the benzene-isopropyl alcohol solvent and the results corrected accordingly. The acid number is determined from the following equation:

$$\frac{\text{ml. of } KOH \times N \times 56.1}{\text{g. of sample}} = \text{Acid number}$$

What I claim and desire to protect by Letters Patent is:

1. A water-insoluble resinous reaction product of a petroleum hydrocarbon-insoluble pine wood resin and ethylene oxide, said reaction product being characterized by a combined ethylene oxide content of from about 12% to about 60%, by being substantially free of carboxyl acidity as evidenced by its A. N. (isopropyl alcohol-benzene)

and by having a substantially reduced phenolic hydroxyl acidity as compared with the original pine wood resin as evidenced by the respective A. N.'s (ethylenediamine).

2. A water-insoluble resinous reaction product of a petroleum hydrocarbon-insoluble pine wood resin and ethylene oxide, said reaction product being characterized by a combined ethylene oxide content of from about 17% to about 25%, by being substantially free of carboxyl acidity as evidenced by its A. N. (isopropyl alcohol-benzene) and by having a substantially reduced phenolic hydroxyl acidity as compared with the original pine wood resin as evidenced by the respective A. N.'s (ethylenediamine).

3. The process which comprises reacting a petroleum hydrocarbon-insoluble pine wood resin and a limited amount of ethylene oxide at a temperature of at least 80° C. but below the temperature of decomposition of said pine wood resin to provide a water-insoluble resin characterized by having a combined ethylene oxide content of from about 12% to about 60%, by being substantially free of carboxyl acidity as evidenced by its A. N. (isopropyl alcohol-benzene) and by having a substantially reduced phenolic hydroxyl acidity as compared with the original pine wood resin as evidenced by the respective A. N.'s (ethylenediamine).

4. The process of claim 3 wherein the reaction is effected in the presence of an ethylene oxide addition catalyst.

5. The process of claim 4 wherein the catalyst employed is an alkaline material.

6. The process of claim 5 wherein the catalyst employed is an alkaline material which is a compound of an alkali metal.

7. The process of claim 6 wherein the catalyst employed is the sodium soap of extracted petroleum hydrocarbon-insoluble pine wood resin.

8. The process of claim 6 wherein the catalyst employed is sodium methylate.

9. The process which comprises reacting a petroleum hydrocarbon-insoluble pine wood resin and ethylene glycol under conditions adapted to yield the monoester of ethylene glycol and then reacting the monoester with a limited amount of ethylene oxide at a temperature of at least 80° C. but below the temperature of decomposition of said monoester to provide a water-insoluble resin characterized by having a total combined ethylene oxide content of from about 12% to about 60% (including both the ethylene oxide per se reacted and the ethylene oxide equivalent of the ethylene glycol reacted), by being substantially free of carboxyl acidity as evidenced by its A. N. (isopropyl alcohol-benzene) and by having a substantially reduced phenolic hydroxyl acidity as compared with the original pine wood resin as evidenced by the respective A. N.'s (ethylenediamine).

ALFRED L. RUMMELSBURG.

REFERENCES CITED

The following references are of record in the file of this patent:

UNITED STATES PATENTS

| Number | Name | Date |
| --- | --- | --- |
| 1,845,198 | Schmidt | Feb. 16, 1932 |
| 2,114,393 | Lane | Apr. 19, 1938 |
| 2,371,235 | Gardner | Mar. 13, 1945 |

FOREIGN PATENTS

| Number | Country | Date |
| --- | --- | --- |
| 467,571 | Great Britain | June 16, 1937 |